United States Patent
Rotellini et al.

(10) Patent No.: US 11,325,653 B2
(45) Date of Patent: May 10, 2022

(54) REINFORCED PILLAR FOR A VEHICLE

(71) Applicant: Ford Global Technologies, LLC, Dearborn, MI (US)

(72) Inventors: Joseph C. Rotellini, Farmington Hills, MI (US); Ryan Gabrielli, Novi, MI (US); Satish Ganti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/032,826

(22) Filed: Sep. 25, 2020

(65) Prior Publication Data
US 2022/0097769 A1    Mar. 31, 2022

(51) Int. Cl.
*B62D 25/04* (2006.01)
*B62D 27/02* (2006.01)
*B62D 25/02* (2006.01)

(52) U.S. Cl.
CPC .......... *B62D 25/04* (2013.01); *B62D 27/023* (2013.01); *B62D 25/02* (2013.01)

(58) Field of Classification Search
CPC ....... B62D 25/04; B62D 27/023; B62D 25/02
USPC .................................................... 296/193.06
See application file for complete search history.

(56) References Cited

U.S. PATENT DOCUMENTS

| | | | |
|---|---|---|---|
| 6,485,089 B2 * | 11/2002 | Hanyu | B62D 21/15 29/897.2 |
| 9,487,239 B2 | 11/2016 | Schnug et al. | |
| 9,533,713 B2 * | 1/2017 | Steffens | B62D 29/008 |
| 2018/0354014 A1 | 12/2018 | Viaux et al. | |
| 2020/0324825 A1 * | 10/2020 | Han | B60R 22/24 |

FOREIGN PATENT DOCUMENTS

| | | |
|---|---|---|
| CN | 109850019 A | 6/2019 |
| EP | 1712419 B1 | 6/2009 |
| JP | H 101068 A | 1/1998 |

* cited by examiner

*Primary Examiner* — Dennis H Pedder
(74) *Attorney, Agent, or Firm* — Burris Law, PLLC

(57) ABSTRACT

The present disclosure relates to a vehicle frame that includes a first pillar and a second pillar. The first pillar includes an upper member that has a first upper flange and a second upper flange. The first pillar also includes a lower member that extends outwardly from the second upper flange. The lower flange includes a chamfer and a transition portion, such that the chamfer has an arcuate shape that extends from the second upper flange to the transition portion. Further, the chamfer includes a first portion a second portion, such that the first portion and the second portion are angularly displaced with respect to the horizontal axis.

20 Claims, 10 Drawing Sheets

REINFORCED PILLAR FOR A VEHICLE

BACKGROUND

Technical Field

The present disclosure generally relates to vehicle pillars.

Description of the Related Art

Vehicle pillars, such as the A-pillar, B-pillar, C-pillar, and D-pillar form part of an upper body structure that connects a roof to a lower body structure.

BRIEF SUMMARY

The present disclosure relates to a pillar of a vehicle frame with improved manufacturing and assembling efficiencies, and robust and compact form factors.

In one embodiment, a vehicle frame of the present disclosure includes a first pillar and a second pillar. The first pillar includes an upper member that has a first upper flange and a second upper flange. The first pillar also includes a lower member that extends outwardly from the second upper flange. The lower flange includes a chamfer and a transition portion, such that the chamfer has an arcuate shape that extends from the second upper flange to the transition portion.

According to another embodiment of the present disclosure, a vehicle pillar that has an upper member has a first upper flange and a second upper flange. In addition, the vehicle pillar includes a lower member that extends outwardly from the second upper flange. The lower member includes a chamfer and a transition portion, such that the chamfer has an arcuate shape that extends from the second upper flange to the transition portion.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
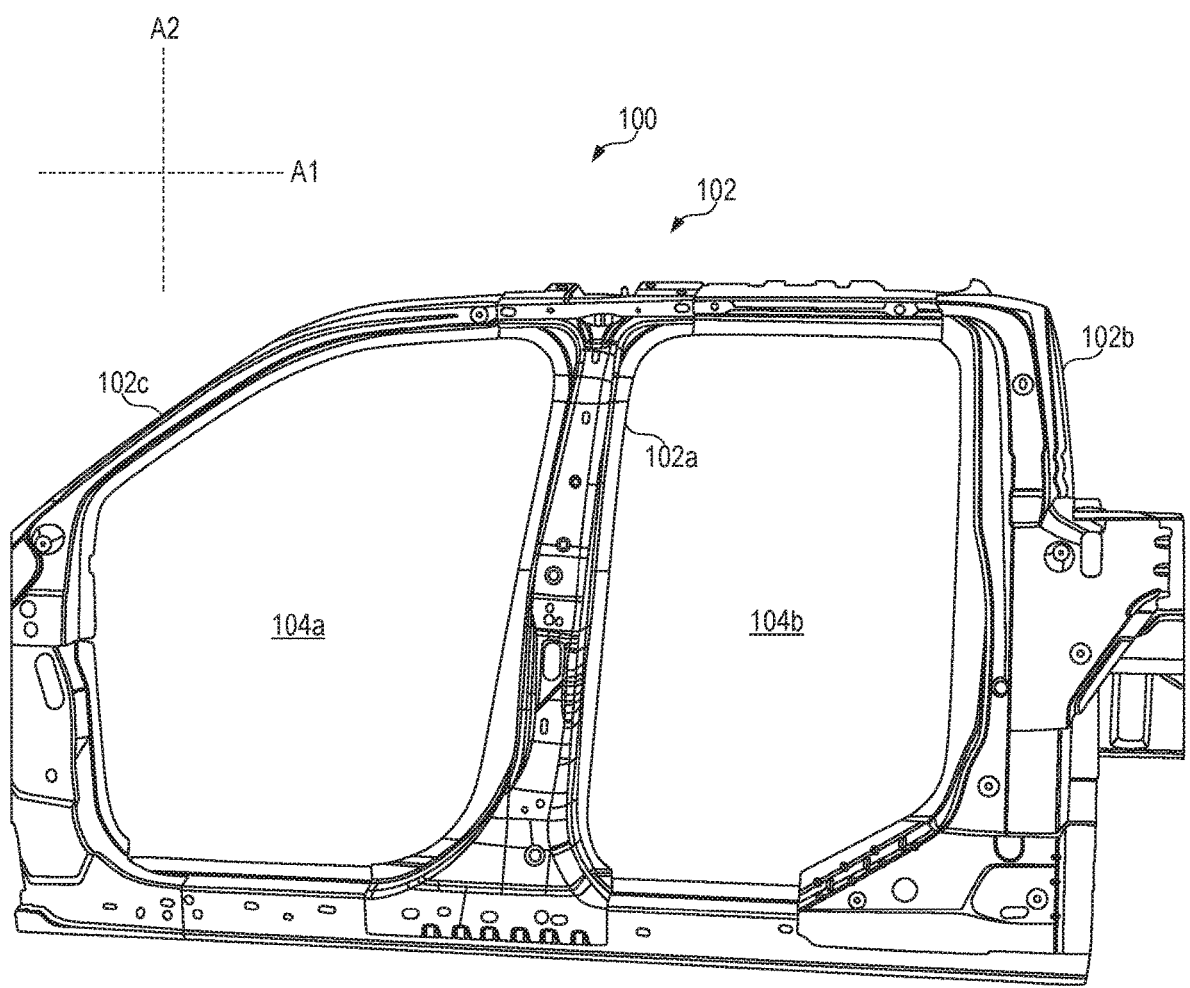
FIG. 1 illustrates a partial side view of vehicle frame, in accordance with one embodiment of the present disclosure.
Figure 2:
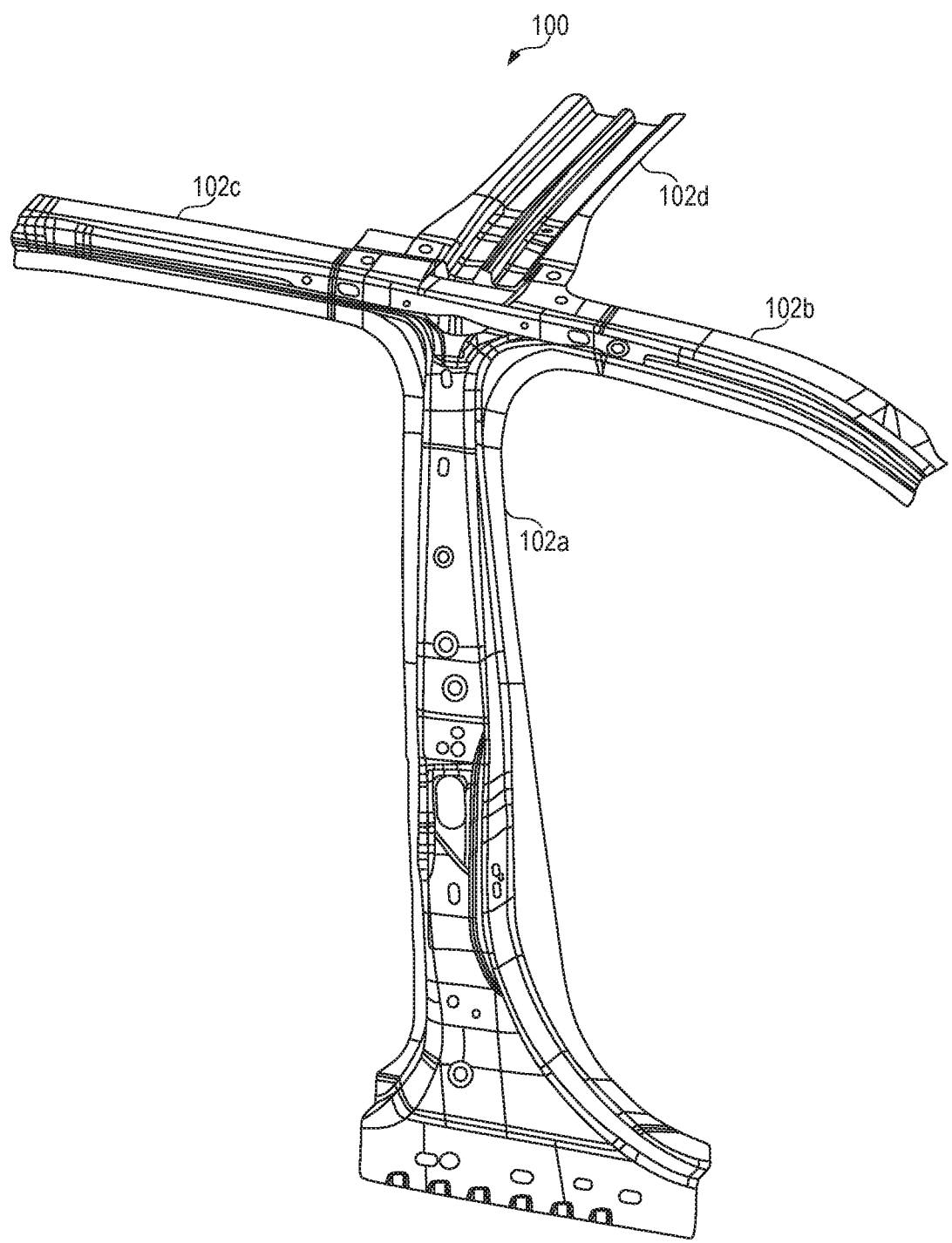
FIG. 2 illustrates an isometric view of a portion of the vehicle frame depicting vehicle pillars, in accordance with one embodiment of the present disclosure.

FIGS. 1 and 2 illustrate different views of a vehicle frame 100, in accordance with one embodiment of the present disclosure. In particular, FIG. 1 shows a side view of the vehicle frame 100 and FIG. 2 shows an isometric view of a portion of the vehicle frame 100 depicting different pillars thereof.

In some embodiments, the vehicle frame 100 can be manufactured by stamping a sheet metal to form the vehicle frame 100 and, thereafter, coupling a plurality of vehicle pillars 102 to the vehicle frame 100. The vehicle pillars 102 can include a B-pillar, e.g., a first pillar 102a, an A-pillar, e.g., a second pillar 102b, a C-pillar, e.g., a third pillar 102c. The vehicle pillars 102, in some embodiments, may a roof portion (not shown for clarity of illustration and description) of the vehicle frame 100. The vehicle pillars 102 form openings 104a, 104b to provide egress and digress to a cabin compartment of the vehicle. For example, the openings 104a, 104b can be covered by pivotably coupled doors, which provide egress and digress to the cabin compartment of the vehicle.

Referring to FIG. 2, the vehicle pillars 102 can be coupled together by welding, fasteners, or similar coupling structures. In one example embodiment shown in FIGS. 1-4B, the vehicle pillars 102 are welded to each other. In particular, the first pillar 102a is coupled to the second pillar 102b and arranged to be generally perpendicular to the second pillar 102b. In addition, the first pillar 102a is coupled to the third pillar 102c, such that the third pillar 102c is also generally perpendicular to the first pillar 102a and extending from the first pillar 102a in an opposite direction to the direction in which the second pillar 102b extends from the first pillar 102a. As described above, the first pillar 102a, the second pillar 102b, and the third pillar 102c are coupled to each other by welding. In addition, the first pillar 102a may be coupled to a roof pillar, e.g., a fourth pillar 102d that extends perpendicularly relative to the first pillar 102a, such that the fourth pillar 102d and the first pillar 102a form an L-shape structure.

Figure 3:
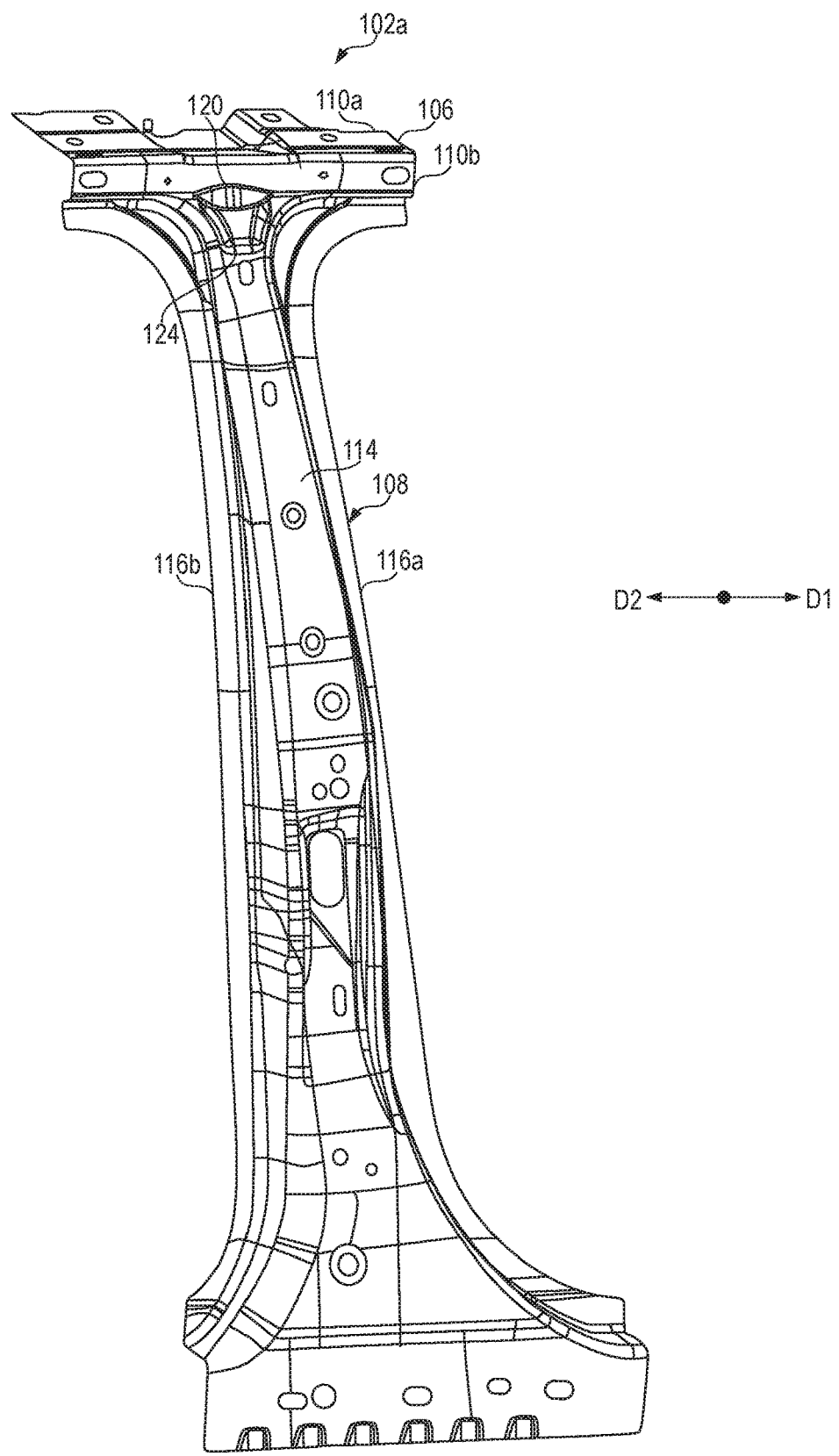
FIG. 3 illustrates a front view of a first pillar, in accordance with one embodiment of the present disclosure.
Figure 4A:
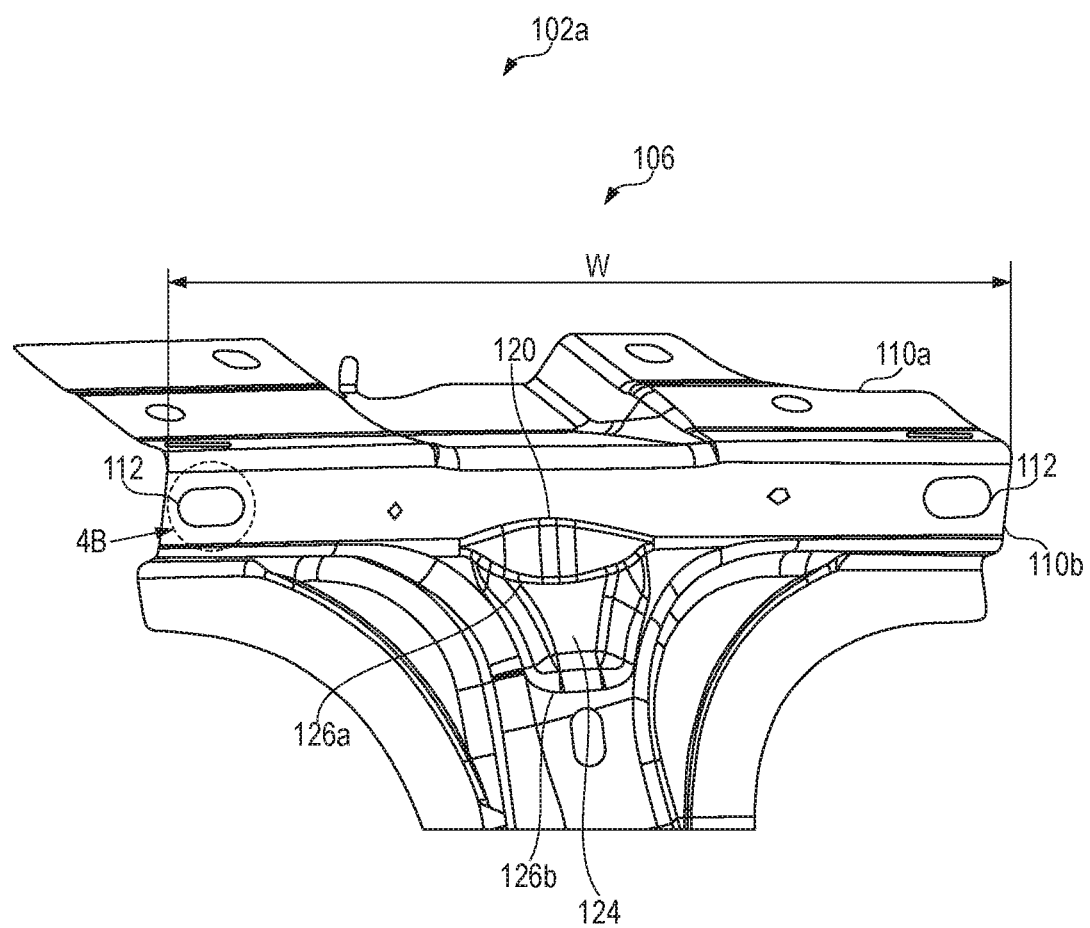
FIG. 4A illustrates a front view of a portion of the first pillar of FIG. 2, in accordance with one embodiment of the present disclosure.
Figure 4B:
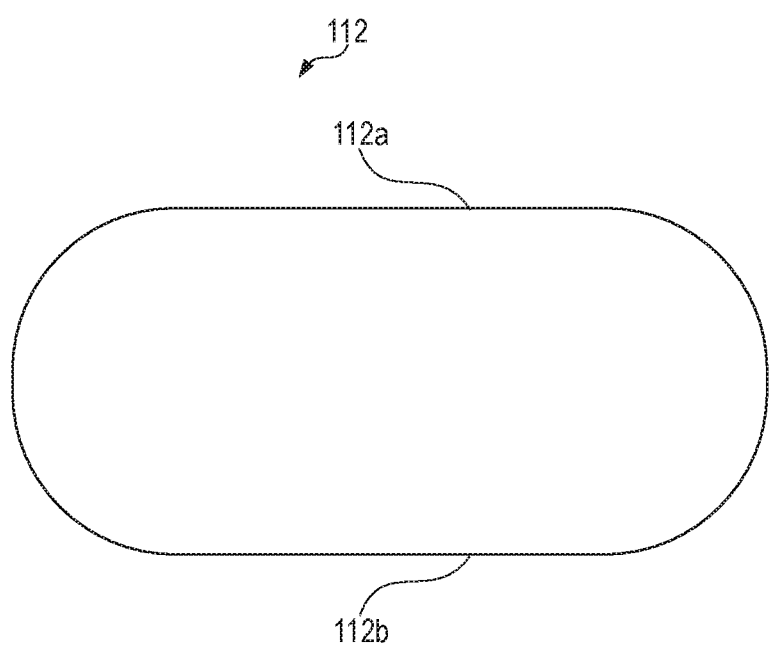
FIG. 4B illustrates a detail view of a portion of the first pillar of FIG. 4A.
Figure 5:
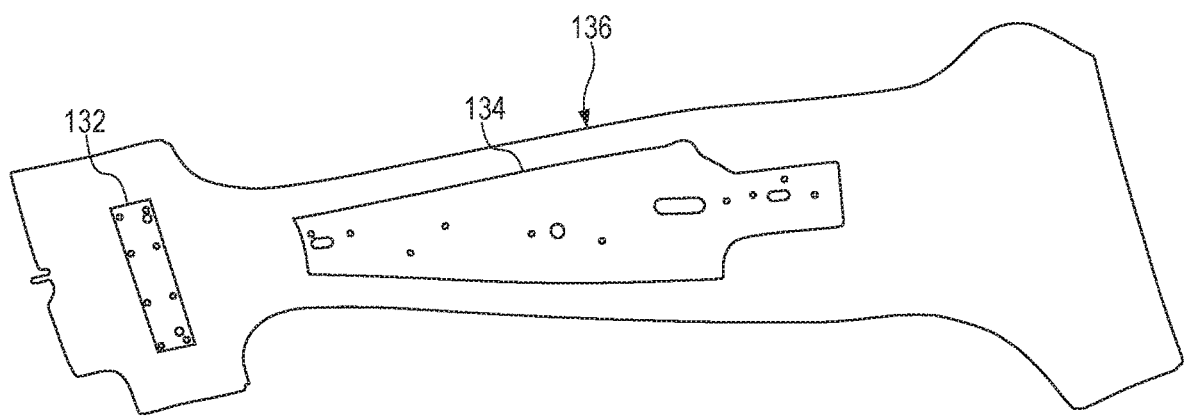
FIG. 5 illustrates a blank used to manufacture the first pillar of FIG. 2, in accordance with one embodiment of the present disclosure.
Figure 6:
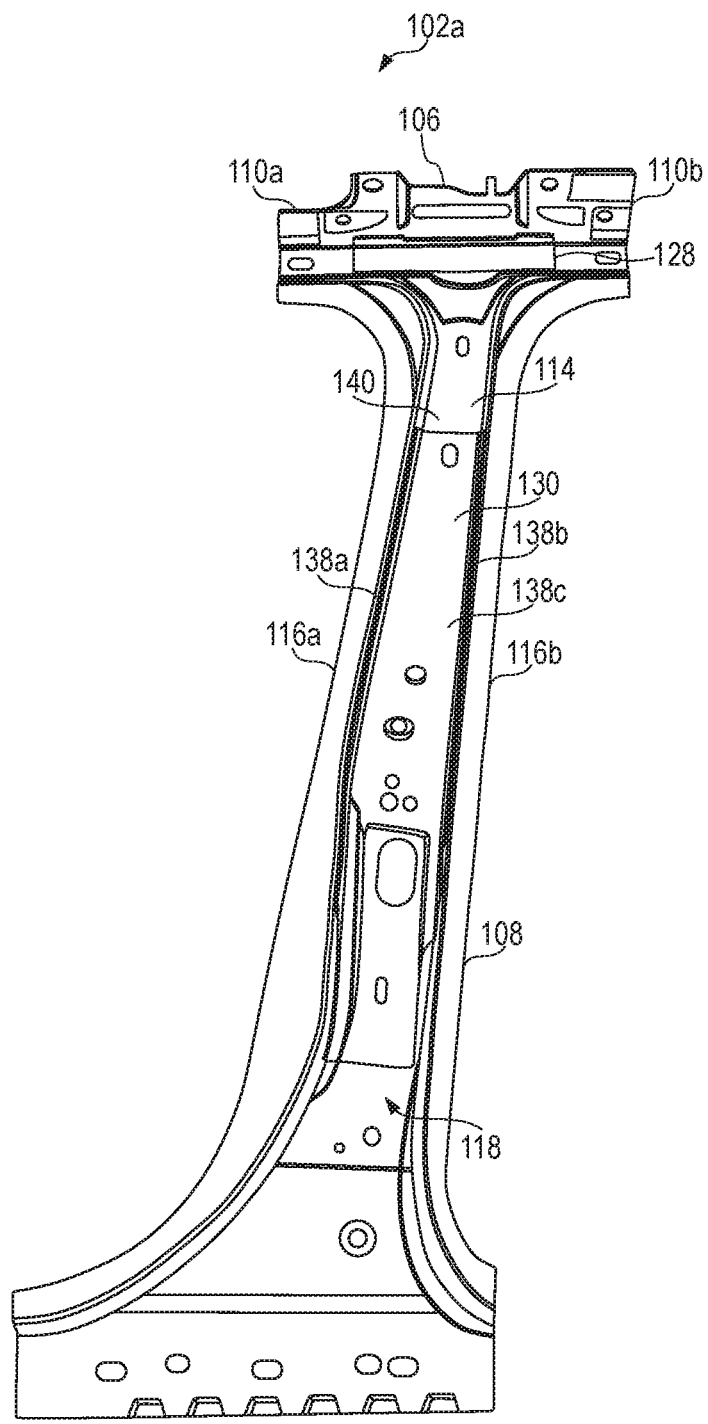
FIG. 6 illustrates a rear view of the first pillar of FIG. 2, in accordance with one embodiment of the present disclosure.
Figure 7:
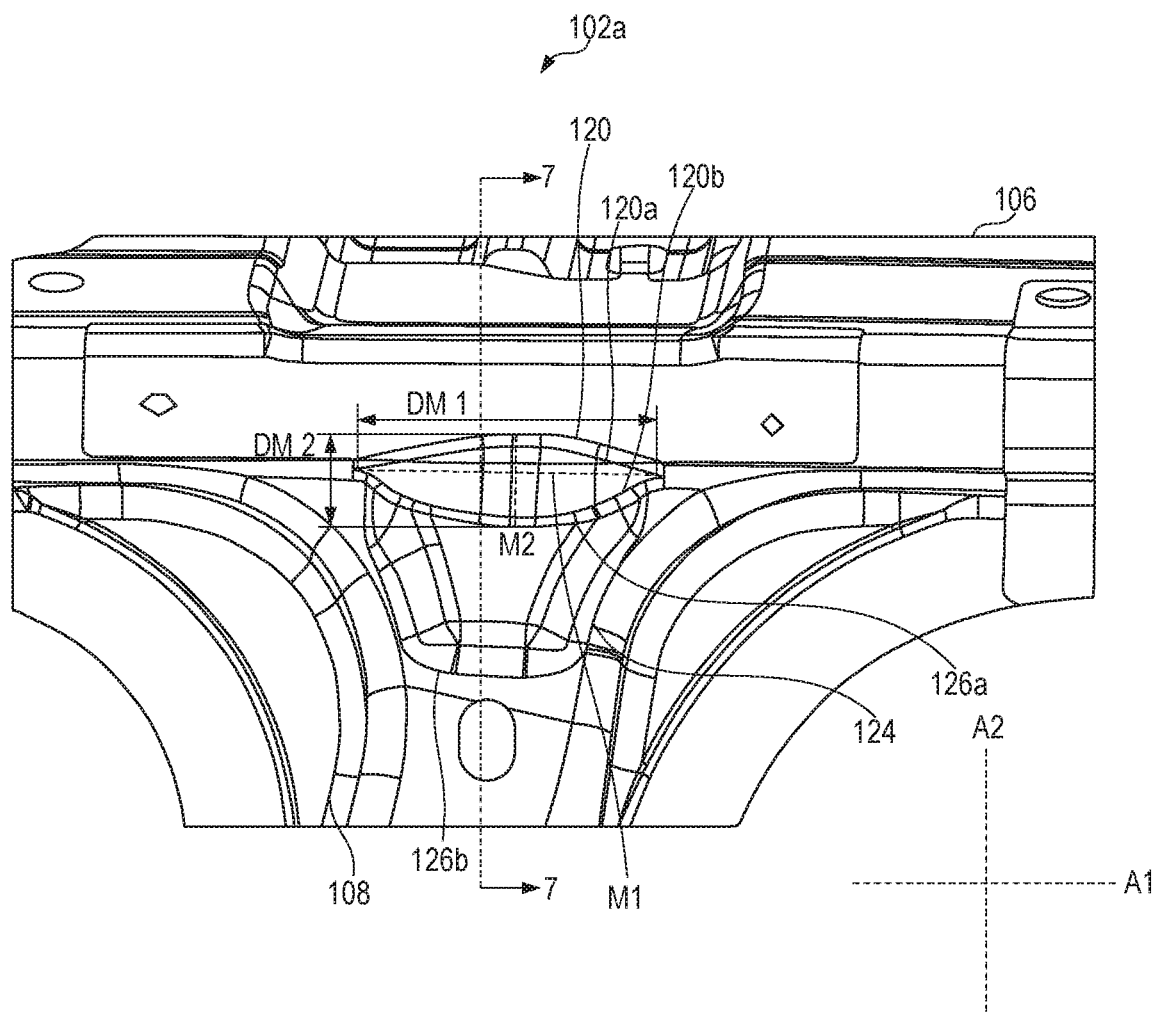
FIG. 7 illustrates a front view of a portion of the first pillar of FIG. 2, in accordance with one embodiment of the present disclosure.
Figure 8:
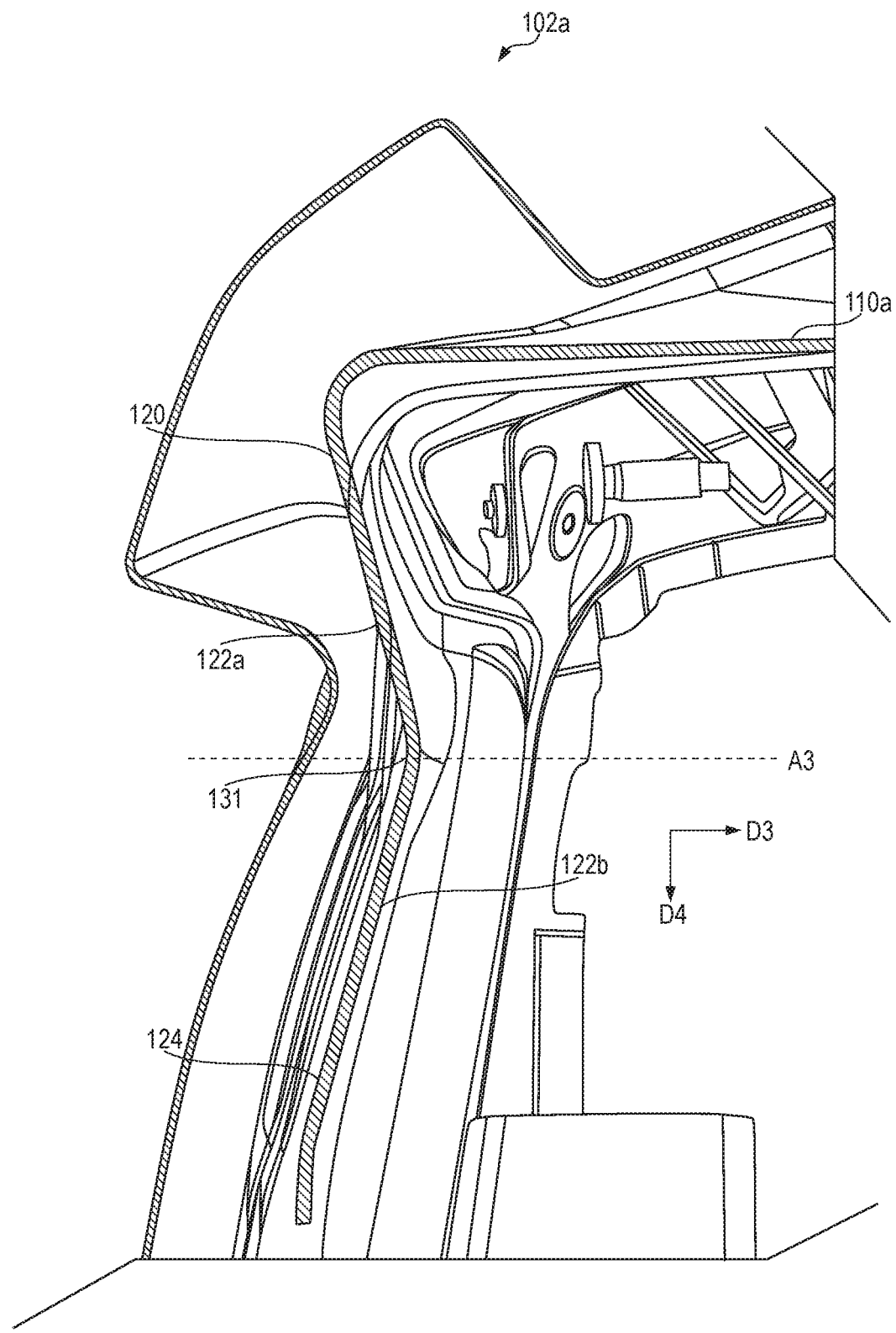
FIG. 8 illustrates a section view of the first pillar of FIG. 2, taken along line 7-7 in FIG. 7.
Figure 9:
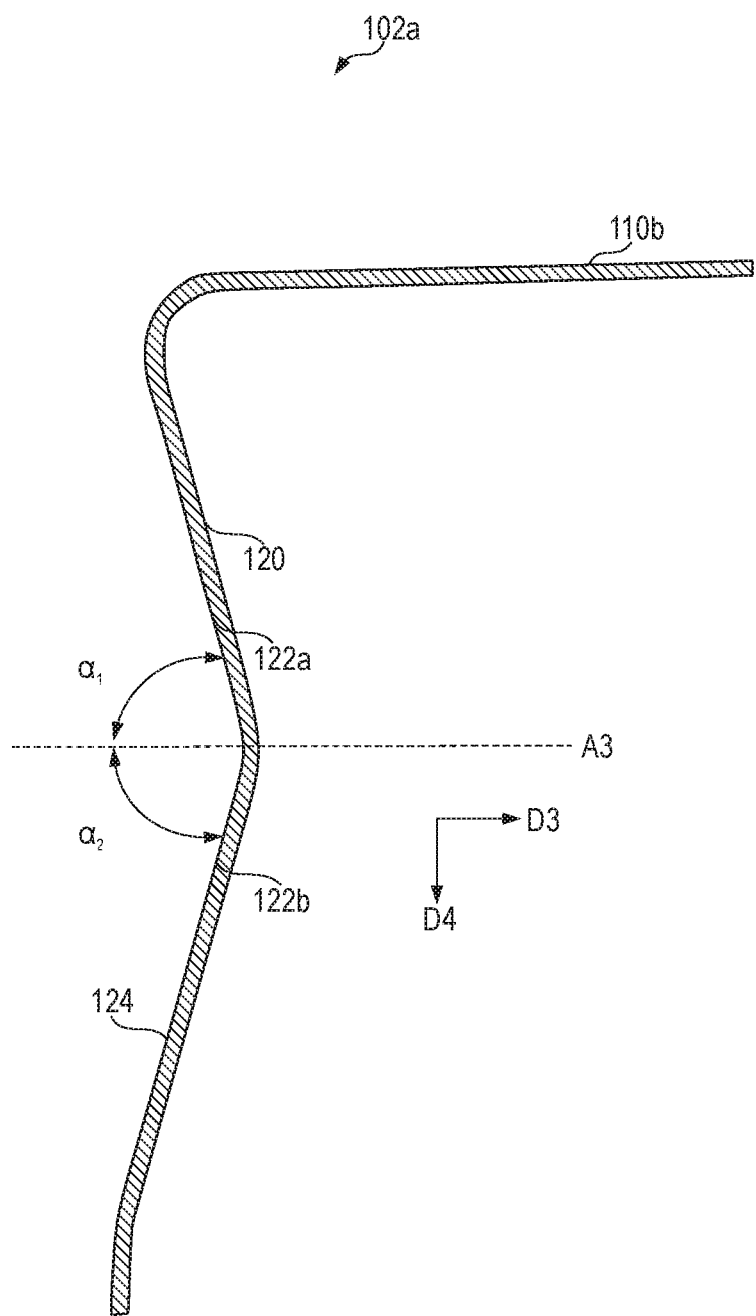
FIG. 9 illustrates the section view of the first pillar of FIG. 8, with certain components removed for clarity of illustration and description.

FIGS. 3 to 9 illustrate various views of the first pillar 102a (and portions thereof). It should be noted that various features and components shown and described with respect to the first pillar 102a may be incorporated in any other pillar of a vehicle, including the second, third, and fourth pillars 102b, 102c, 102d. In particular, FIG. 3 illustrates a front view of the vehicle pillar 102a when viewed from an exterior of the vehicle frame 100. FIG. 4A illustrates a front view of a portion of the first pillar 102a and FIG. 4B illustrates a detailed view of a portion of an upper member 106 of the first pillar 102a. FIG. 5 illustrates a blank used to manufacture the first pillar 102a, FIG. 6 illustrates a rear view of the first pillar 102a when viewed from an interior of the vehicle, and FIG. 7 illustrates a portion of the first pillar 102a. FIG. 8 illustrates a section view of the first pillar 102a, and FIG. 9 illustrates details of the section view of FIG. 8, with certain components removed for clarity of illustration and description.

With reference to FIGS. 3-9, the first pillar 102a includes the upper member 106 and a lower member 108, in accordance with one embodiment of the present disclosure. The upper member 106 and the lower member 108 form a main body of the first pillar 102a. The upper member 106 includes a first upper flange 110a and a second upper flange 110b extending perpendicularly from the first upper flange 110a. In some embodiments, the first upper flange 110a and the second upper flange 110b, individually or in combination, may couple to other vehicle structures, for example, the second, third, and fourth pillars 102b, 102c, 102d. For example, a portion of the second pillar 102b may be positioned under, or mate with, the first upper flange 110a and a portion of the third pillar 102c may be positioned under, or mate with, the first upper flange 110a. In the illustrated embodiment, the second pillar 102b and third pillar 102c can be coupled to the first upper flange 110a and the second upper flange 110b via welding, fastening, or other similar coupling structures. In one example embodiment, the second pillar 102b and third pillar 102c can be coupled to the first upper flange 110a and the second upper flange 110b via gas metal arc welding. The gas metal arc welding can be selected to improve accessibility during manufacturing as the pillars may be welded from one side, in contrast to other welding processes, such as, for example, spot welds, which may require removal of panels and other structures to provide sufficient access to the weld region.

The upper member 106 includes a plurality of slots 112 in the second upper flange 110b as shown in FIG. 4B, which facilitate one-sided welding, e.g., gas metal arc welding. The slots 112 on the second upper flange 110b are sized and shaped to allow access to overlapping portions of the second upper flange 110b and the second pillar 102b, or any other pillars that are coupled to the first pillar 102a, from an exterior of the vehicle frame 100.

The lower member 108 extends from the upper member 106. In the illustrated embodiment, the lower member 108 extends outwardly from the second upper flange 110b. The lower member 108 may be sized, shaped, and arranged to allow coupling of a vehicle door to cover the openings 104a, 104b as described above. The lower member 108 includes a cap portion 114, a first lower flange 116a, and a second lower flange 116b that extend from sides of the cap portion 114. In particular, the first lower flange 116a extends from the cap portion 114 in a first direction D1 and the second lower flange 116b extends from the cap portion 114 in a second direction D2, which is opposite to the first direction D1. The cap portion 114 and the first and second lower flanges 116a, 116b generally form a hat-shaped structure to define a recess 118, which is shown in more detail in FIG. 6.

The lower member 108 includes a chamfer 120 that is positioned in a transition region between the second upper flange 110b and the lower member 108. As shown in more detail in FIG. 7, the chamfer 120 has a major axis M1 and a minor axis M2. In an example, the major axis M1 is parallel to a horizontal axis A1 of the vehicle frame 100 (FIG. 1) and the minor axis M2 is parallel to a vertical axis A2 of the vehicle frame 100 (FIG. 1).

The chamfer 120 has a first curved edge 120a that defines an upper portion of the chamfer 120 and a second curved edge 120b, opposite to the first curved edge 120a, that defines a lower portion of the chamfer 120. Both the first curved edge 120a and the second curved edge 120b have a first dimension DM1 along the major axis A1. In addition, the chamfer 120 has a second dimension DM2 along the minor axis M2, such that the first dimension DM1 is greater the second dimension DM2. As shown in FIG. 7, for example, the chamfer has a generally arcuate shape.

As shown in more detail in FIGS. 8 and 9, the chamfer 120 forms a depression that extends in a third direction D3 and a fourth direction D4 along the length of the cap portion 114. The chamfer 120 includes a first portion 122a and a second portion 122b that form a V-shaped section. The first portion 122a is angularly spaced with respect to a horizontal axis A3 and extends at a first angle $\alpha_1$ with respect to the horizontal axis A3. Similarly, the second portion 122b is also angularly spaced with respect to the horizontal axis A3 and extends at a second angle $\alpha_2$ with respect to the horizontal axis A3. In one example, the first angle $\alpha_1$, and the second angle $\alpha_2$ are the same. In another example, the first angle and the second angle $\alpha_2$ are unequal.

As described above, the chamfer 120 is positioned in a transition region. In particular, the lower member 108 includes a transition portion 124. The transition portion 124 has a first end 126a and a second end 126b, and is generally tapered and positioned proximate to the cap portion 114. As described above, the chamfer 120 has a first portion 122a and a second portion 122b to form a V-shaped structure. The chamfer 120 extends between the second upper flange 110b and the transition portion 124. In one example, the transition portion 124 extends from the second portion 122b of the chamfer 120, as shown in FIGS. 8 and 9, such that the transition portion 124 is angularly spaced with respect to the horizontal axis A3.

The chamfer 120, individually or in combination with the transition portion 124, is generally sized and shaped to provide a structural brace to resist bending moments in the vehicle pillar, e.g., first pillar 102a. For example, at an apex region 131 of the V-shaped chamfer 120, the angular displacement of the chamfer inhibits bending of the first pillar 102a.

In some embodiments, to mitigate or improve structural issues caused by manufacturing defects, such as, for example, kinks, the first pillar 102a includes a first reinforcing bracket 128, as shown in more detail in FIG. 6, which is positioned in the upper member 106. In addition, the first pillar 102a includes a second reinforcing bracket 130 that is positioned in the lower member 108. In some embodiments, the first and second reinforcing brackets 128, 130 can be integrally formed with the first pillar 102a. For example, as shown in FIG. 5, the first reinforcing bracket 128 and the second reinforcing bracket 130 may be positioned as metal sheets 132, 134, respectively, on a blank 136. Thereafter, the metal pieces 132, 134 are stamped along with the blank 136 to form the first pillar 102a.

As shown in FIG. 6, after the metal pieces 132, 134 are stamped along with the blank 136 to form the first pillar 102a, the first reinforcing bracket 128 generally has an L-shaped structure, with a flange mating with first upper flange 110a and another flange mating with the second upper flange 110b. The second reinforcing bracket 130, after stamping, includes a first bracket flange 138a that mates with the first lower flange 116a and a second bracket flange 138b that mates with the second lower flange 116b, and a third flange 138c that mates with a web flange 140 of the cap portion 114.

The various embodiments described above can be combined to provide further embodiments. Moreover, these and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A vehicle frame, comprising:
   a first pillar including:
      an upper member having a first upper flange and a second upper flange;
      a lower member extending outwardly from the second upper flange, the lower member including a depression and a transition portion, the depression having an arcuate shape that extends from the second upper flange to the transition portion; and
   a second pillar coupled to the first pillar,
   wherein the depression has a first curved edge that defines an upper portion of the depression and an opposed second curved edge that defines a lower portion of the depression.

2. The vehicle frame of claim 1 wherein the upper member includes one or more slots that are sized and shaped to provide exterior access to coupling the first pillar to the second pillar via welding.

3. The vehicle frame of claim 2 wherein the welding comprises gas metal arc welding.

4. The vehicle frame of claim 1 wherein the depression includes a major axis and a minor axis, the major axis parallel to a horizontal axis of the vehicle frame, and the minor axis parallel to a vertical axis of the vehicle frame.

5. The vehicle frame of claim 1 wherein the depression includes a first portion that is angularly displaced with respect to a horizontal axis and a second portion that is angularly displaced with respect to the horizontal axis.

6. The vehicle frame of claim 5 wherein the first portion is angularly displaced with respect to the horizontal axis at a first angle, and the second portion is angularly displaced with respect to the horizontal axis at a second angle.

7. The vehicle frame of claim 6 wherein the first angle and the second angle are the same.

8. The vehicle frame of claim 1 wherein the transition portion is angularly displaced with respect to a horizontal axis.

9. The vehicle frame of claim 1 wherein the lower member includes:
   a cap portion;
   a first lower flange extending from the cap portion; and
   a second lower flange extending from the cap portion.

10. The vehicle frame of claim 9 wherein the first lower flange extends outwardly from the cap portion in a first direction, and the second lower flange extends outwardly from the cap portion in a second direction, the first direction being opposite the second direction.

11. The vehicle frame of claim 9, further comprising:
    a first reinforcing bracket coupled to the first pillar.

12. The vehicle frame of claim 11 wherein the cap portion includes a recess that is sized and shaped to coupleably receive the first reinforcing bracket.

13. The vehicle frame of claim 1, further comprising:
    a second reinforcing bracket coupled to the first pillar.

14. The vehicle frame of claim 13 wherein the second reinforcing bracket includes a first bracket flange that mates with the first upper flange and a second bracket flange that mates with the second upper flange.

15. The vehicle frame of claim 1, further comprising:
    a third pillar coupled to the first pillar.

16. The vehicle frame of claim 15 wherein the lower member includes one or more slots that are sized and shaped to provide exterior access to coupling the first pillar to the third pillar via welding.

17. The vehicle frame of claim 16 wherein the welding comprises gas metal arc welding.

18. A vehicle pillar, comprising:
    an upper member having a first upper flange and a second upper flange; and
    a lower member extending outwardly from the second upper flange, the lower member including a depression and a transition portion, the depression having an arcuate shape that extends from the second upper flange to the transition portion,
    wherein the depression has a first curved edge that defines an upper portion of the depression and an opposed second curved edge that defines a lower portion of the depression.

19. The vehicle pillar of claim 18 wherein the depression includes a major axis and a minor axis, the major axis parallel to a horizontal axis of a vehicle frame, and the minor axis parallel to a vertical axis of the vehicle frame.

20. The vehicle pillar of claim 19 wherein the depression includes a first portion that is angularly displaced with respect to a horizontal axis and a second portion that is angularly displaced with respect to the horizontal axis.

* * * * *